(12) United States Patent
Mizutani et al.

(10) Patent No.: US 7,533,944 B2
(45) Date of Patent: May 19, 2009

(54) BRAKE CONTROL APPARATUS AND BRAKE CONTROL METHOD

(75) Inventors: Yasuji Mizutani, Susono (JP); Eiji Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/764,957

(22) Filed: Jun. 19, 2007

(65) Prior Publication Data

US 2008/0001473 A1    Jan. 3, 2008

(30) Foreign Application Priority Data

Jun. 28, 2006    (JP) .............................. 2006-177600

(51) Int. Cl.
B60T 8/48    (2006.01)
(52) U.S. Cl. .................................... 303/113.4; 303/155
(58) Field of Classification Search ... 303/113.1–113.5, 303/114.1, 122–122.14
See application file for complete search history.

(56) References Cited

U.S. PATENT DOCUMENTS

| | | | | |
|---|---|---|---|---|
| 4,824,183 A * | 4/1989 | Uchida et al. | .......... | 303/122.07 |
| 4,874,207 A * | 10/1989 | Nishii et al. | ................. | 303/52 |
| 6,206,489 B1 * | 3/2001 | Schmidt et al. | ........ | 303/122.08 |
| 6,354,672 B1 * | 3/2002 | Nakamura et al. | ....... | 303/113.1 |
| 6,425,644 B2 * | 7/2002 | Kawahata et al. | ........... | 303/122 |
| 6,595,599 B2 * | 7/2003 | Soga | ....................... | 303/113.1 |
| 6,957,870 B2 * | 10/2005 | Kagawa et al. | ........... | 303/113.4 |

FOREIGN PATENT DOCUMENTS

| | | |
|---|---|---|
| JP | 2001-106056 | 4/2001 |
| JP | 2005-35471 | 2/2005 |
| JP | 2006-15876 | 1/2006 |
| JP | 2006-123889 | 5/2006 |

* cited by examiner

*Primary Examiner*—Christopher P Schwartz
(74) *Attorney, Agent, or Firm*—Oblon, Spivak, McClelland, Maier & Neustadt, P.C.

(57) ABSTRACT

A brake control apparatus includes wheel cylinders which apply braking force to wheels when supplied with hydraulic fluid; a wheel cylinder pressure control system that controls a wheel cylinder pressure independently of a brake operating member operation; a manual hydraulic pressure source that includes first and second hydraulic pressure sources that pressurize the hydraulic fluid; a hydraulic fluid supply path that connects the manual hydraulic pressure source to the wheel cylinders; and a controller. Communication through the hydraulic fluid supply path is interrupted when the wheel cylinder pressure control system controls the wheel cylinder pressure, and the communication is permitted when the wheel cylinder pressure deviates from a target pressure. The controller executes control so that the hydraulic fluid from the first hydraulic pressure source starts to be supplied after the hydraulic fluid from the second hydraulic pressure source starts to be supplied.

20 Claims, 4 Drawing Sheets

BRAKE CONTROL APPARATUS AND BRAKE CONTROL METHOD

INCORPORATION BY REFERENCE

The disclosure of Japanese Patent Application No. 2006-177600 filed on Jun. 28, 2006 including the specification, drawings and abstract is incorporated herein by reference in its entirety.

BACKGROUND OF THE INVENTION

1. Field of the Invention

The invention relates to a brake control apparatus and brake control method that controls the braking force applied to the wheels of a vehicle.

2. Description of the Related Art

Japanese Patent Application Publication No. 2005-35471 (JP-A-2005-35471) describes a hydraulic pressure control apparatus that controls the braking force applied to the wheels of a vehicle. The hydraulic pressure control apparatus is provided with an actuator that includes a pair of electromagnetic control valves respectively used to increase and decrease the pressure of the hydraulic fluid supplied to a wheel cylinder provided at each wheel; and an electronic control unit that controls the actuator. In this hydraulic pressure control apparatus, the operation amount of a brake pedal is measured by, for example, a sensor, and translated into an electric signal that is transmitted to the electronic control unit. The electronic control unit controls the electromagnetic control valve that changes the pressure, thereby controlling the pressures of the hydraulic fluid supplied to the wheel cylinders for the four wheels of the vehicle independently from each other in an optimum manner. Accordingly, the vehicle runs highly stably and safely. Controlling the braking force based on electric signals translated from the operations executed by the driver is generally referred to as "brake by wire".

Japanese Patent Application Publication No. 2006-15876 (JP-A-2006-15876) describes a brake control apparatus provided with a shut-off valve that shuts off communication between a master cylinder and the wheel cylinders; and electric power supply amount control means for changing the amount of electric power supplied to a coil of the shut-off valve in accordance with the magnitude of hydraulic pressure detected by hydraulic pressure detection means. With this brake control apparatus, the amount of heat released from the shut-off valve is reduced, which allows the use of a smaller coil.

In the apparatus described above, however, the flow of the hydraulic fluid delivered from the master cylinder in response to a brake pedal operation is interrupted instead of being permitted to reach the wheel cylinders during the control through brake-by-wire. Accordingly, if the wheel cylinder pressure abruptly drops due to, for example, occurrence of a malfunction, or the master cylinder pressure abruptly increases due to a sudden brake pedal operation, the response of the braking force to the braking operation may be affected due to a delay of control or a delay of detection inherent in a control system.

SUMMARY OF THE INVENTION

The invention provides a brake control apparatus and brake control method that offers higher reliability.

A first aspect of the invention relates to a brake control apparatus that includes wheel cylinders each of which applies braking force to one of a plurality of wheels when supplied with hydraulic fluid; a wheel cylinder pressure control system that controls the wheel cylinder pressure, which is the pressure of the hydraulic fluid supplied to the wheel cylinders, independently of the operation of a brake operating member; a manual hydraulic pressure source that includes a first hydraulic pressure source which pressurizes hydraulic fluid stored in a hydraulic chamber of the first hydraulic pressure source in accordance with the operation amount of the brake operating member; and a second hydraulic pressure source that adjusts the pressure of hydraulic fluid stored in a hydraulic chamber of a second hydraulic pressure source in accordance with the pressure of the hydraulic fluid in the hydraulic chamber of the first hydraulic pressure source; a hydraulic fluid supply path that connects the manual hydraulic pressure source to the wheel cylinders; and a controller that controls the manner in which the hydraulic fluid is supplied to the wheel cylinders. In the brake control apparatus, communication between the manual hydraulic pressure source and the wheel cylinders through the hydraulic fluid supply path is interrupted when the wheel cylinder pressure control system controls the wheel cylinder pressure, and the communication between the manual hydraulic pressure source and the wheel cylinders through the hydraulic fluid supply path is permitted so that the hydraulic fluid is supplied from the manual hydraulic pressure source to the wheel cylinders when the wheel cylinder pressure deviates from the target pressure. When the hydraulic fluid starts to be supplied to the wheel cylinders through the hydraulic fluid supply path, the controller controls the manner in which the hydraulic fluid is supplied to the wheel cylinders so that the hydraulic fluid from the first hydraulic pressure source starts to be supplied after the hydraulic fluid from the second hydraulic pressure source starts to be supplied.

Generally, the wheel cylinder pressure is controlled by the wheel cylinder pressure control system. However, when the wheel cylinder pressure deviates from the target pressure due to, for example, a failure, the hydraulic fluid is supplied to the wheel cylinders through the hydraulic fluid supply path that connects the manual hydraulic pressure source and the wheel cylinders. The manual hydraulic pressure source includes the first hydraulic pressure source that pressurizes the hydraulic fluid stored in the hydraulic chamber thereof in accordance with the operation amount of the brake operating member, and the second hydraulic pressure source that adjusts the pressure of the hydraulic fluid in the second hydraulic pressure source in accordance with the pressure of the hydraulic fluid in the first hydraulic pressure source. When the supply of the hydraulic fluid to the wheel cylinders through the hydraulic fluid supply path is started, the hydraulic fluid from the first hydraulic pressure source starts to be supplied after the hydraulic fluid from the second hydraulic pressure source starts to be supplied.

Accordingly, the deviation of the wheel cylinder pressure from the target pressure is promptly reduced by the supply of the hydraulic fluid from the second hydraulic pressure source. Then, the hydraulic fluid from the first hydraulic pressure source starts to be supplied, and the deviation of the wheel cylinder pressure from the target pressure is further reduced due to the supply of the hydraulic fluid from both the first and the second hydraulic pressure sources to the wheel cylinders. Starting the supply of the hydraulic fluid from the first hydraulic pressure source after the start of the supply of the hydraulic fluid from the second hydraulic pressure source makes it possible to reduce the consumption of the hydraulic fluid in the first hydraulic pressure source. The first hydraulic pressure source pressurizes the hydraulic fluid in accordance with the operation amount of the brake operating member, and delivers the pressurized hydraulic fluid to the wheel cylinders. If the consumption of the hydraulic fluid in the first hydraulic pressure source is reduced, a greater amount of the hydraulic fluid in the first hydraulic pressure source remains available for occasions where the supply of the hydraulic fluid from the first hydraulic pressure source is really required due to, for example, a failure. As a result, the fail-safe properties of the brake control apparatus improve, which facilitates execution of the brake control with higher reliability.

In the first aspect of the invention, the wheel cylinders may include a first wheel cylinder, provided at a wheel among the plurality of wheels, to which a greater braking force is allocated, and a second wheel cylinder, provided at another wheel among the plurality of wheels, to which a braking force less than the braking force applied by the first wheel cylinder is allocated. The hydraulic fluid supply path may include a first supply path that connects the first hydraulic pressure source to the first wheel cylinder, and a second supply path that connects the second hydraulic pressure source to the second wheel cylinder, and the hydraulic fluid supply path may be provided with a partition valve that is provided at the middle portion of a passage that connects the first supply path to the second supply path and that partitions the hydraulic fluid supply path into the first supply path and the second supply path when the partition valve is closed. The controller may close the partition valve after the hydraulic fluid from the second hydraulic pressure source starts to be supplied in order to partition the hydraulic fluid supply path into the first supply path and the second supply path so that the first wheel cylinder is supplied with the hydraulic fluid from the first hydraulic pressure source and the second wheel cylinder is supplied with the hydraulic fluid from the second hydraulic pressure source.

With this configuration, the partition valve is closed after the hydraulic fluid from the second hydraulic pressure source starts to be supplied. Accordingly, the hydraulic fluid is supplied from the second hydraulic pressure source to both the first and the second wheel cylinders before the partition valve is closed, which reduces the deviation of the wheel cylinder pressure from the target pressure. After the partition valve is closed, the hydraulic fluid supply path is partitioned into the first supply path and the second supply path. Then, the first wheel cylinder that is provided at the wheel to which a greater braking force is allocated and that greatly contributes to braking of the vehicle is supplied with the hydraulic fluid from the first hydraulic pressure source through the first supply path, and the second wheel cylinder that less contributes to the braking of the vehicle is supplied with the hydraulic fluid from the second hydraulic pressure source through the second supply path.

Accordingly, it is possible to suppress the delivery of the hydraulic fluid from the first hydraulic pressure source to the second wheel cylinder that less contributes to the braking of the vehicle before the partition valve is closed. Thus, a greater amount of hydraulic fluid is maintained in the first hydraulic pressure source, which reduces the possibility that the amount of the hydraulic fluid supplied to the first wheel cylinder that greatly contributes to the braking of the vehicle is insufficient. As a result, it is possible to improve the fail-safe properties of the brake control.

When priority is given to maintenance of the sufficient hydraulic fluid in the first hydraulic pressure source and reliable supply of the sufficient amount of hydraulic fluid to the first wheel cylinder after the hydraulic fluid supply path is partitioned into the first supply path and the second supply path, preferably, the controller controls the manner in which the hydraulic fluid is supplied to the wheel cylinders so that the hydraulic fluid from the first hydraulic pressure source starts to be supplied after the partition valve is closed. Meanwhile, when priority is given to reduction of the deviation of the wheel cylinder pressure from the target pressure, preferably, the controller controls the manner in which the hydraulic fluid is supplied to the wheel cylinders so that the hydraulic fluid from the first hydraulic pressure source starts to be supplied before the partition valve is closed.

In the first aspect of the invention, the hydraulic fluid supply path may be further provided with a first check valve provided on the first supply path and a second check valve provided on the second supply path. When the wheel cylinder pressure control system controls the wheel cylinder pressure, the controller may close both the first check valve and the second check valve. When the pressure difference between the upstream side and the downstream side of the first check valve or the second check valve increases, the controller may control the valve opening pressure for the first check valve and the valve opening pressure for the second check valve so that the second check valve is mechanically opened before the first check valve is opened.

With this configuration, when the wheel cylinder pressure control system controls the wheel cylinder pressure, the first and the second check valves provided on the hydraulic fluid supply path extending from the manual hydraulic pressure source to the wheel cylinders are closed so that the flow of the hydraulic fluid through the hydraulic fluid supply path is interrupted. If the pressure difference between the upstream side and the downstream side of the first or the second check valve increases in this state, the valve opening pressure for the first check valve and the valve opening pressure for the second check valve are controlled so that the second check valve is mechanically opened before the first check valve is opened. Thus, the consumption of the hydraulic fluid in the first hydraulic pressure source is reduced by starting the supply of the hydraulic fluid from the first hydraulic pressure source after the supply of the hydraulic fluid from the second hydraulic pressure source is started. Mechanically opening the valve means that the check valve is opened due to a change in the differential pressure applied to the check valve.

The controller may set the valve opening pressure for the first check valve to a value higher than the valve opening pressure for the second check valve so that the second check valve is opened before the first check valve is opened. In other words, the controller may control the first check valve and the second check valve so that it is easier to open the second check valve than the first check valve.

In the first aspect of the invention, each of the first check valve and the second check valve may be a normally open electromagnetically controlled valve that is kept closed by an electromagnetic force generated when the check valve is supplied with a control current having a prescribed magnitude, and that is open when the supply of the control current is interrupted. The controller may supply a medium current having a smaller magnitude than the control current to each of the first check valve and the second check valve while the first check valve and the second check valve need to be kept closed.

With this configuration, each of the first check valve and the second check valve closes when the control current having the prescribed magnitude is supplied thereto, and opens when the supply of the control current is interrupted. When these check valves need to be kept closed, the controller supplies a medium current having the smaller magnitude than the prescribed control current to each of the check valves. Thus, the valve opening pressure for the check valve is made lower than the prescribed valve opening pressure. Adjusting the magnitude of the medium currents supplied to each check valve makes it possible to control the valve opening pressure for the first check valve and the valve opening pressure for the second check valve so that the second check valve is mechanically opened before the first check valve is opened. Because the medium current is smaller in magnitude than the prescribed control current, the power consumption in the check valve is suppressed.

The controller may supply a medium current having a uniform magnitude to the first and the second check valves. Thus, it is possible to control the medium current in a simple manner. Alternatively, the controller may vary the medium current that is supplied when each of the first and the second check valve is closed in accordance with the pressure difference between the upstream side and the downstream side of the check valve or the pressure of the hydraulic fluid upstream of the check valve. Thus, it is possible to further reduce the power consumption.

The brake control apparatus according to the first aspect may further include a power hydraulic pressure source that pressurizes the hydraulic fluid in the power hydraulic pressure source when supplied with power; and a reservoir that stores the hydraulic fluid which is supplied to the first hydraulic pressure source. The first hydraulic pressure source may be a master cylinder that is shut off from the reservoir so that the flow of the hydraulic fluid from the reservoir into the master cylinder is interrupted when the brake operating member is operated, and that pressurizes the hydraulic fluid stored in the hydraulic chamber in accordance with the operation amount of the brake operating member. The second hydraulic pressure source may be a regulator that adjusts the pressure of the hydraulic fluid delivered from the power hydraulic pressure source in accordance with the pressure of the hydraulic fluid in the hydraulic chamber of the first hydraulic pressure source.

With this configuration, the flow of the hydraulic fluid to the master cylinder is interrupted while the braking operation is executed. Accordingly, the amount of the hydraulic fluid that is stored in the hydraulic chamber of the master cylinder and that can be delivered to the wheel cylinders is relatively limited. In contrast, the regulator can be supplied with the hydraulic fluid from the power hydraulic pressure source even while the braking operation is executed. Accordingly, there is a relatively great margin of the amount of brake fluid that can be delivered from the regulator to the wheel cylinders. Therefore, the hydraulic fluid from the master cylinder starts to be supplied to the wheel cylinders after the hydraulic fluid from the regulator starts to be supplied to the wheel cylinders. This makes it possible to promptly reduce the deviation of the wheel cylinder pressure from the target pressure using the hydraulic fluid from the regulator, while reducing the consumption of the hydraulic fluid in the master cylinder, which is limited in volume.

In the first aspect of the invention, the hydraulic fluid supply path may be further provided with a first check valve provided on the first supply path and a second check valve provided on the second supply path. When the partition valve is closed, the controller may control the valve opening pressure for the first check valve and the valve opening pressure for the second check valve in accordance with the valve opening pressure for the partition valve.

The two control valves, that is, the first check valve and the partition valve are arranged between the first hydraulic pressure source and the second wheel cylinder. Accordingly, even if the valve opening pressure for the first check valve is set to a low value, it is possible to reduce the amount of the hydraulic fluid flowing from the first hydraulic pressure source to the second wheel cylinder while the partition valve is closed, because the valve opening pressure for the first check valve is set with the valve opening pressure of the partition valve taken into account.

In the first aspect of the invention, the first wheel cylinder may apply the braking force to a front wheel among the plurality of wheels, and the second wheel cylinder may apply the braking force to a rear wheel among the plurality of wheels.

A second aspect of the invention relates to a brake control method. According to the brake control method, when the wheel cylinder pressure, which is the pressure of hydraulic fluid supplied to wheel cylinders, deviates from the target pressure while the wheel cylinder pressure is controlled using hydraulic fluid pressurized in response to a supply of power, the manner in which the hydraulic fluid is supplied to the wheel cylinders is controlled so that the hydraulic fluid from a master cylinder starts to be supplied to the wheel cylinders after the hydraulic fluid from a regulator starts to be supplied to the wheel cylinders.

According to the second aspect of the invention, it is possible to promptly reduce the deviation of the wheel cylinder pressure from the target pressure using the hydraulic fluid from the regulator. In addition, it is possible to reduce the consumption of the hydraulic fluid in the master cylinder, which is limited in volume.

In the second aspect of the invention, when the wheel cylinder pressure deviates from the target pressure, the manner in which the hydraulic fluid is supplied to the wheel cylinders may be controlled so that the regulator is mechanically communicated with the wheel cylinders before the master cylinder is communicated with the wheel cylinders.

With this configuration, if the wheel cylinder pressure deviates from the target pressure, communication through the hydraulic fluid supply path is mechanically permitted so that the hydraulic fluid is supplied to the wheel cylinders through the hydraulic fluid supply path. Conventionally, when the wheel cylinder pressure deviates from the target pressure, the control for reducing such deviation is started after the deviation is detected. However, with the configuration described above, even before the deviation is detected, it is possible to reduce the deviation by mechanically permitting the flow of the hydraulic fluid through the hydraulic fluid supply path. As a result, the wheel cylinder pressure is controlled more accurately by such mechanical operation, and the brake control having higher reliability is executed.

BRIEF DESCRIPTION OF THE DRAWINGS

The forgoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EXAMPLE EMBODIMENT

Hereafter, an example embodiment of the invention will be described with reference to the accompanying drawings.

Figure 1:
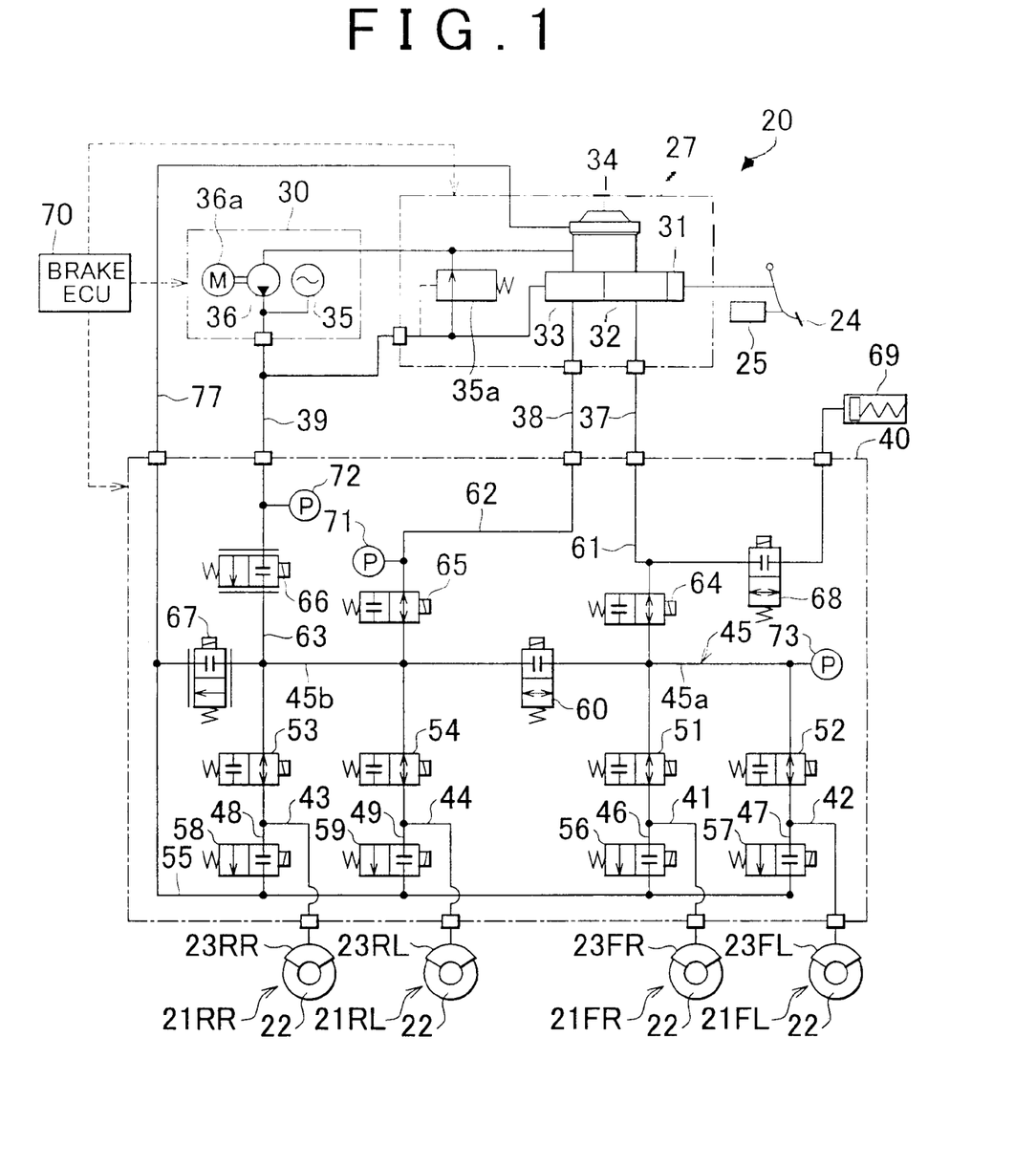
FIG. 1 is the system diagram showing a brake control apparatus according to an embodiment of the invention.

FIG. 1 is the system diagram showing a brake control apparatus 20 according to an embodiment of the invention. The brake control apparatus 20 shown in FIG. 1 forms an electronically controlled brake (ECB) system for a vehicle, and controls the braking force applied to four wheels of a vehicle. The brake control apparatus 20 according to the embodiment of the invention is mounted on, for example, a hybrid vehicle provided with an electric motor and an internal combustion engine that serve as driving power sources. In a hybrid vehicle, braking force may be applied to the vehicle through a regenerative braking operation in which the kinetic energy of the vehicle is converted into electric energy and stored or a hydraulic pressure braking operation executed by the brake control apparatus 20. In the vehicle in the embodiment of the invention, it is also possible to execute a cooperative braking control to generate the desired braking force through combined execution of the regenerative braking operation and the hydraulic pressure braking operation.

As shown in FIG. 1, the brake control apparatus 20 includes disc brake units 21 FR, 21 FL, 21 RR and 21 RL that are provided at respective four wheels, a master cylinder unit 27, a power hydraulic pressure source 30, and a hydraulic actuator 40.

The disc brake units 21 FR, 21 FL, 21 RR and 21 RL apply braking force to the right front wheel, the left front wheel, the right rear wheel and the left rear wheel of the vehicle, respectively. In the embodiment of the invention, the braking force allocated to the front wheels is generally greater than the braking force allocated to the rear wheels. The master cylinder unit 27, which serves as a manual hydraulic pressure source, delivers the brake fluid pressurized in accordance with the operation amount of a brake pedal 24 that serves as a brake pedal operation member, to the disc brake units 21 FR, 21 FL, 21 RR and 21 RL. The power hydraulic pressure source 30 delivers the brake fluid, used as the hydraulic fluid, pressurized due to a power supply, to the disc brake units 21 FR, 21 FL, 21 RR and 21 RL independently of any operations of the brake pedal 24. The hydraulic actuator 40 appropriately adjusts the hydraulic pressure of the brake fluid supplied from the power hydraulic pressure source 30 or the master cylinder unit 27, and then delivers the brake fluid to the disc brake units 21 FR, 21 FL, 21 RR and 21 RL. Thus, the braking force applied to each wheel through the hydraulic pressure braking operation is adjusted.

The disc brake units 21 FR, 21 FL, 21 RR and 21 RL, the master cylinder unit 27, the power hydraulic pressure source 30, and the hydraulic actuator 40 will be described below in more detail. The disc brake units 21 FR, 21 FL, 21 RR and 21 RL include brake discs 22, and wheel cylinders 23 FR, 23 FL, 23 RR and 23 RL incorporated in brake calipers, respectively. The wheel cylinders 23 FR to 23 RL are connected to the hydraulic actuator 40 via respective fluid passages. Hereinafter, the wheel cylinders 23 FR to 23 RL will be collectively referred to as the "wheel cylinders 23".

In the disc brake units 21 FR, 21 FL, 21 RR and 21 RL, when the brake fluid is supplied from the hydraulic actuator 40 to the wheel cylinders 23, brake pads that serve as friction members are pressed to the brake discs 22 that rotate together with the wheels. Thus, braking force is applied to each wheel. In the embodiment of the invention, the disc brake units 21 FR to 21 RL are used. Alternatively, other braking force applying mechanisms including the wheel cylinders 23, for example, a drum brake unit may be used.

In the embodiment of the invention, the master cylinder unit 27 is provided with a hydraulic pressure booster. The master cylinder unit 27 includes a hydraulic pressure booster 31, a master cylinder 32, a regulator 33, and a reservoir 34. The hydraulic pressure booster 31 is connected to the brake pedal 24. The hydraulic pressure booster 31 amplifies the pedal depression force applied to the brake pedal 24, and then transfers the amplified pedal depression force to the master cylinder 32. The pedal depression force is amplified by supplying the brake fluid from the power hydraulic pressure source 30 to the hydraulic pressure booster 31 through the regulator 33. Then, the master cylinder 32 generates the master cylinder pressure corresponding to the value obtained by amplifying the pedal depression force by predetermined number of times.

The reservoir 34 that stores the brake fluid is provided above the master cylinder 32 and the regulator 33. The master cylinder 32 communicates with the reservoir 34 when the brake pedal 24 is not depressed. The regulator 33 communicates with both the reservoir 34 and an accumulator 35 of the power hydraulic pressure source 30. The regulator 33 generates the fluid pressure substantially equal to the master cylinder pressure using the reservoir 34 as a low-pressure source and the accumulator 35 as a high-pressure source. Hereinafter, the hydraulic pressure in the regulator 33 will be referred to as the "regulator pressure". The master cylinder pressure need not be exactly equal to the regulator pressure. For example, the master cylinder 27 may be designed so that the regulator pressure is slightly higher than the master cylinder pressure.

The power hydraulic pressure source 30 includes the accumulator 35 and a pump 36. The accumulator 35 converts the pressure energy of the brake fluid pressurized by the pump 36 into the pressure energy of the filler gas such as nitrogen, for example, the pressure energy having a pressure of approximately 14 to 22 MPa, and stores the pressure energy. The pump 36 has a motor 36a that serves as a driving power source. The inlet of the pump 36 is connected to the reservoir 34, and the outlet thereof is connected to the accumulator 35. The accumulator 35 is connected also to a relief valve 35a provided in the master cylinder unit 27. When the pressure of the brake fluid in the accumulator 35 abnormally increases and becomes, for example, approximately 25 MPa, the relief valve 35a opens, and the brake fluid having a high pressure is returned to the reservoir 34.

As described above, the brake control apparatus 20 includes the master cylinder 32, the regulator 33, and the accumulator 35 that serve as brake fluid supply sources from which the brake fluid is supplied to the wheel cylinders 23. A master pipe 37 is connected to the master cylinder 32. A regulator pipe 38 is connected to the regulator 33. An accumulator pipe 39 is connected to the accumulator 35. The master pipe 37, the regulator pipe 38 and the accumulator pipe 39 are connected to the hydraulic actuator 40.

The hydraulic actuator 40 includes an actuator block having a plurality of passages formed therein, and a plurality of electromagnetically controlled valves. Examples of the passages formed in the actuator block include individual passages 41, 42, 43 and 44 and a main passage 45. The individual passages 41, 42, 43 and 44 each branch off from the main passage 45, and are connected to the wheel cylinders 23 FR, 23 FL, 23 RR and 23 RL of the disc brake units 21 FR, 21 FL, 21 RR and 21 RL, respectively. Thus, communication is provided between the wheel cylinders 23 and the main passage 45.

ABS maintaining valves 51, 52, 53 and 54 are provided at the middle portions of the individual passages 41, 42, 43 and 44, respectively. Each of the ABS maintaining valves 51, 52, 53 and 54 includes a solenoid subjected to the ON/OFF control and a spring, and is a normally open electromagnetically controlled valve that is open when electric power is not supplied to the solenoid. Each of the ABS maintaining valves 51 to 54 allows the brake fluid to flow in either direction, when it is open. Namely, each of the ABS maintaining valves 51 to 54 allows the brake fluid to flow from the main passage 45 to the wheel cylinders 23, and also allows the brake fluid to flow from the wheel cylinders 23 to the main passage 45. When electric power is supplied to the solenoids and the ABS maintaining valves 51 to 54 are closed, the flow of the brake fluid through the individual passages 41 to 44 is interrupted.

In addition, the wheel cylinders 23 are connected to a reservoir passage 55 via pressure-decreasing passages 46, 47, 48 and 49 connected to the individual passages 41, 42, 43 and 44, respectively. ABS pressure-decreasing valves 56, 57, 58 and 59 are provided at the middle portions of the pressure-decreasing passages 46, 47, 48 and 49, respectively. Each of the ABS pressure-decreasing valves 56 to 59 includes a solenoid subjected to the ON/OFF control and a spring, and is a normally closed electromagnetically controlled valve that is closed when electric power is not supplied to the solenoid. When the ABS pressure-decreasing valves 56 to 59 are closed, the flow of the brake fluid through the pressure-decreasing passages 46 to 49 is interrupted. When electric power is supplied to the solenoids and the ABS pressure-decreasing valves 56 to 59 are opened, the brake fluid flows through the pressure-decreasing passages 46 to 49, and the brake fluid is returned from the wheel cylinders 23 to the reservoir 34 through the pressure-decreasing passages 46 to 49 and the reservoir passage 55. The reservoir passage 55 is connected to the reservoir 34 of the master cylinder unit 27 via a reservoir pipe 77.

A partition valve 60 is provided at the middle portion of the main passage 45. The main passage 45 is partitioned into a first passage 45a connected to the individual passages 41 and 42, and a second passage 45b connected to the individual passages 43 and 44, when the partition valve 60 is closed. The first passage 45a is connected to the wheel cylinders 23 FR and the 23 FL for the front wheels via the individual passages 41 and 42, respectively. The second passage 45b is connected to the wheel cylinders 23 RR and 23 FL for the rear wheels via the individual passages 43 and 44, respectively.

The partition valve 60 includes a solenoid subjected to the ON/OFF control and a spring, and is a normally closed electromagnetically controlled valve. When the partition valve 60 is closed, the flow of the brake fluid through the main passage 45 is interrupted. When electric power is supplied to the solenoid and the partition valve 60 is opened, the brake fluid flows between the first passage 45a and the second passage 45b in either direction.

In the hydraulic actuator 40, a master passage 61 and a regulator passage 62 that communicate with the main passage 45 are formed. More specifically, the master passage 61 is connected to the first passage 45a of the main passage 45, and the regulator passage 62 is connected to the second passage 45b of the main passage 45. The master passage 61 is connected to the master pipe 37 that communicates with the master cylinder 32. The regulator passage 62 is connected to the regulator pipe 38 that communicates with the regulator 33.

A master cut valve 64 is provided at the middle portion of the master passage 61. The master cut valve 64 is provided on the path through which the brake fluid is supplied from the master cylinder 32 to the wheel cylinders 23. The master cut valve 64 includes a solenoid subjected to the ON/OFF control and a spring, and is a normally open electromagnetically controlled valve that is reliably kept closed by the electromagnetic force that is generated by the solenoid when a control current having a prescribed magnitude is supplied to the solenoid, and that is open when electric power is not supplied to the solenoid. When the master cut valve 64 is open, the brake fluid flows between the master cylinder 32 and the first passage 45a of the main passage 45 in either direction. When the control current having the prescribed magnitude is supplied to the solenoid and the master cut valve 64 is closed, the flow of the brake fluid through the master passage 61 is interrupted.

A stroke simulator 69 is connected to the master passage 61 via a simulator cut valve 68, at a position upstream of the master cut valve 64. Namely, the simulator cut valve 68 is provided on the passage that connects the master cylinder 32 to the stroke simulator 69. The simulator cut valve 68 includes a solenoid subjected to the ON/OFF control and a spring, and is a normally closed electromagnetically controlled valve. When the simulator cut valve 68 is closed, the flow of the brake fluid through the master passage 61 between the simulator cut valve 68 and the stroke simulator 69 is interrupted. When electric power is supplied to the solenoid and the simulator cut valve 68 is opened, the brake fluid flows between the master cylinder 32 and the stroke simulator 69 in either direction.

The stroke simulator 69 includes a plurality of pistons and a plurality of springs. When simulator cut valve 68 is opened, the stroke simulator 69 generates a reaction force corresponding to the depression force applied to the brake pedal 24. Preferably, a stroke simulator that has multi-stage spring characteristics is used as the stroke simulator 69 in order to improve the brake pedal operating feel felt by the driver.

A regulator cut valve 65 is provided at the middle portion of the regulator passage 62. The regulator cut valve 65 is provided on the path through which the brake fluid is supplied from the regulator 33 to the wheel cylinders 23. The regulator cut valve 65 also includes a solenoid subjected to the ON/OFF control and a spring, and is a normally open electromagnetically controlled valve. When the regulator cut valve 65 is open, the brake fluid flows between the regulator 33 and the second passage 45b of the main passage 45 in either direction. When electric power is supplied to the solenoid and the regulator cut valve 65 is closed, the flow of the brake fluid through the regulator passage 62 is interrupted.

In addition to the master passage 61 and the regulator passage 62, an accumulator passage 63 is formed in the hydraulic actuator 40. One end of the accumulator passage 63 is connected to the second passage 45b of the main passage 45, and the other end thereof is connected to the accumulator pipe 39 that communicates with the accumulator 35.

A pressure-increasing linear control valve 66 is provided at the middle portion of the accumulator passage 63. The accumulator passage 63 and the second passage 45b of the main passage 45 are connected to the reservoir passage 55 via a pressure-decreasing linear control valve 67. Each of the pressure-increasing linear control valve 66 and the pressure-decreasing linear control valve 67 has a linear solenoid and a spring, and is a normally closed electromagnetically controlled valve. The opening amounts of the pressure-increasing linear control valve 66 and the pressure-decreasing control valve 67 are adjusted in proportion to the magnitudes of electric currents supplied to the respective linear solenoids.

The pressure-increasing linear control valve 66 is shared by the multiple wheel cylinders 23 corresponding to the respective wheels. Similarly, the pressure-decreasing linear control valve 67 is also shared by the multiple wheel cylinders 23. Namely, according to the embodiment of the invention, the pressure-increasing linear control valve 66 and the pressure-decreasing linear control valve 67 are provided as a pair of control valves that are shared by the wheel cylinders 23 and that control the hydraulic fluid supplied from the power hydraulic pressure source 30 to the wheel cylinders 23 and the hydraulic fluid returned from the wheel cylinders 23 to the power hydraulic pressure source 30. If the pressure-increasing linear control valve 66, etc. are shared by the wheel cylinders 23 as described above, the cost performance is better than that when the wheel cylinders 23 are provided with respective linear control valves.

The pressure difference between the inlet and the outlet of the pressure-increasing linear control valve 66 corresponds to the difference between the pressure of the brake fluid in the accumulator 35 and the pressure of the brake fluid in the main passage 45. The pressure difference between the inlet and the outlet of the pressure-decreasing linear control valve 67 corresponds to the difference between the pressure of the brake fluid in the main passage 45 and the pressure of the brake fluid in the reservoir 34. When the electromagnetic driving force corresponding to the electric power supplied to the linear solenoid of each of the pressure-increasing linear control valve 66 and the pressure-decreasing linear control valve 67 is F1, the biasing force of the spring of each of the pressure-increasing linear control valve 66 and the pressure-decreasing linear control valve 67 is F2, and the differential pressure acting force corresponding to the pressure difference between the inlet and the outlet of each of the pressure-increasing linear control valve 66 and the pressure-decreasing linear control valve 67 is F3, the equation, F1+F3=F2, is satisfied. Accordingly, the pressure difference between the inlet and the outlet of each of the pressure-increasing linear control valve 66 and the pressure-decreasing linear control valve 67 is controlled by continuously controlling the electric power supplied to the linear solenoid of each of the pressure-increasing linear control valve 66 and the pressure-decreasing linear control valve 67.

In the brake control apparatus 20, the power hydraulic pressure source 30 and the hydraulic actuator 40 are controlled by a brake ECU 70 that serves as a controller according to the embodiment of the invention. The brake ECU 70 is formed of a microprocessor including a CPU. The brake ECU 70 includes, in addition to the CPU, ROM that stores various programs, RAM that temporarily stores data, an input port, an output port, a communication port, etc. The brake ECU 70 communicates with a hybrid ECU (not shown), etc. at a higher level. The brake ECU 70 controls the pump 36 of the power hydraulic pressure source 30, the electromagnetically controlled valves 51 to 54, 56 to 59, and 64 to 68 that form the hydraulic actuator 40 based on the control signals from the hybrid ECU and the signals from various sensors.

A regulator pressure sensor 71, an accumulator pressure sensor 72, and a control pressure sensor 73 are connected to the brake ECU 70. The regulator pressure sensor 71 is provided upstream of the regulator cut valve 65. The regulator pressure sensor 71 detects the pressure of the brake fluid in the regulator passage 62, namely, the regulator pressure, and transmits a signal indicating the detected regulator pressure to the brake ECU 70. The accumulator pressure sensor 72 is provided upstream of the pressure-increasing linear control valve 66. The accumulator pressure sensor 72 detects the pressure of the brake fluid in the accumulator passage 63, namely, the accumulator pressure, and transmits a signal indicating the detected accumulator pressure to the brake ECU 70. The control pressure sensor 73 detects the pressure of the brake fluid in the first passage 45a of the main passage 45, and transmits a signal indicating the detected brake fluid pressure to the brake ECU 70. The signals indicating the values detected by the pressure sensors 71 to 73 are transmitted to the braked ECU 70 at predetermined time intervals, and stored in a predetermined storage region of the brake ECU 70.

When the partition valve 60 is open and the first passage 45a and the second passage 45b of the main passage 45 communicate with each other, the value output from the control pressure sensor 73 indicates the lower hydraulic pressure at the pressure-increasing linear control valve 66 and the higher hydraulic pressure at the pressure-decreasing linear control valve 67. Accordingly, the value output from the control pressure sensor 73 is used to control the pressure-increasing linear control valve 66 and the pressure-decreasing linear control valve 67. When the pressure-increasing linear control valve 66 and the pressure-decreasing linear control valve 67 are both closed and the master cut valve 64 is open, the value output from the control pressure sensor 73 indicates the master cylinder pressure. When the partition valve 60 is open and the first passage 45a and the second passage 45b of the main passage 45 communicate with each other, and the ABS maintaining valves 51 to 54 are open while the ABS pressure-decreasing valves 56 to 59 are closed, the value output from the control pressure sensor 73 indicates the hydraulic fluid pressure that is applied to each of the wheel cylinders 23, namely, the wheel cylinder pressure.

Examples of the sensors connected to the brake ECU 70 include a stroke sensor 25 provided at the brake pedal 24. The stroke sensor 25 detects the brake pedal stroke that is the operation amount of the brake pedal 24, and transmits a signal indicating the detected brake pedal stroke to the brake ECU 70. The value output from the stroke sensor 25 is transmitted to the brake ECU 70 at predetermined time intervals, and stored in a predetermined storage region of the brake ECU 70. Brake pedal operation detection means other than the stroke sensor 25 may be provided in addition to or instead of the stroke sensor 25, and connected to the brake ECU 70. Examples of the brake pedal operation detection means include a pedal depression force sensor that detects the operation force applied to the brake pedal 24, and a brake switch that detects depression of the brake pedal 24.

The brake control apparatus 20 configured in the above-described manner executes the cooperative braking control. The brake control apparatus 20 starts the braking control in response to an instruction to start the braking operation (hereinafter, referred to as a "braking instruction"). Such braking instruction is issued when braking force needs to be applied to the vehicle, for example, when the brake pedal 24 is operated. The brake ECU 70 calculates a required hydraulic pressure braking force, namely, a braking force that needs to be generated by the brake control apparatus 20, by subtracting a regenerative braking force, which is obtained through the regenerative operation, from the required braking force. A signal indicating the regenerative braking force is transmitted from the hybrid ECU to the brake control apparatus 20. The brake ECU 70 then calculates the target hydraulic pressure for each of the wheel cylinders 23 FR to 23 RL based on the calculated required hydraulic pressure braking force. The brake ECU 70 determines the values of the currents that are supplied to the pressure-increasing linear control valve 66 and the pressure-decreasing linear control valve 67 according to the feedback control law so that the wheel cylinder pressure reaches the target hydraulic pressure.

As a result, in the brake control apparatus 20, the brake fluid is supplied from the power hydraulic pressure source 30 to each wheel cylinders 23 through the pressure-increasing linear control valve 66, whereby braking force is applied to each wheel. Also, the brake fluid is discharged from each wheel cylinders 23 through the pressure-decreasing linear control valve 67 when needed, whereby the braking force applied to each wheel is adjusted. According to the embodiment of the invention, a wheel cylinder pressure control system is formed of the power hydraulic pressure source 30, the pressure-increasing linear control valve 66, the pressure-decreasing linear control valve 67, etc. The wheel cylinder pressure control system executes the braking force control through so-called brake-by-wire. The wheel cylinder pressure control system is provided parallel to the path through which the brake fluid is supplied from the master cylinder unit 27 to the wheel cylinders 23.

When the braking force control is executed, the brake ECU 70 closes the regulator cut valve 65 that serves as a second check valve so that the brake fluid delivered from the regulator 33 that serves as a second hydraulic pressure source is not supplied to the wheel cylinders 23. In addition, the brake ECU 70 closes the master cut valve 64 that serves as a first check valve, and opens the simulator cut valve 68. Such control is executed so that the brake fluid, delivered from the master cylinder 32 that serves as a first hydraulic pressure source in response to the operation of the brake pedal 24, is supplied not to the wheel cylinders 23 but to the stroke simulator 69.

However, the wheel cylinder pressure may deviate from the target hydraulic pressure due to a decrease in the wheel cylinder pressure caused by a malfunction such as a failure or due to an abrupt increase in the master cylinder pressure caused by a sudden operation of the brake pedal. The brake ECU 70 periodically determines whether a malfunction has occurred based on, for example, a measured value from the control pressure sensor 73. The brake ECU 70 determines whether a malfunction, for example, a delay in response or poor control has occurred. A delay in response means that the time at which the hydraulic pressure used to control the braking force (hereinafter, referred to as the "control hydraulic pressure") starts increasing is excessively delayed, for example, because the pressure-increasing linear control valve 66 is inappropriately kept closed or the flow volume of the brake fluid is insufficient. Poor control means that the control hydraulic pressure does not reach the target hydraulic pressure, for example, the state where the deviation of the control hydraulic pressure from the target hydraulic pressure exceeds a reference deviation continues for more than a predetermined reference period.

When it is determined that a malfunction has occurred, the brake ECU 70 stops the cooperative braking control, and switches the brake fluid supply path so that the brake fluid is supplied from the master cylinder unit 27 to the wheel cylinders 23. More specifically, the brake ECU 70 stops supplying the control current to the master cut valve 64, the regulator cut valve 65, the partition valve 60 and the simulator cut valve 68 so that the master cut valve 64 and the regulator cut valve 65 are opened and the partition valve 60 and the simulator cut valve 68 are closed. As a result, the brake fluid supply path is partitioned into the path on the master cylinder side and the path on the regulator side. For convenience, this control mode will be referred to as the system partition mode, where appropriate. In the system partition mode, control of the wheel cylinder pressure using the pressure-increasing linear control valve 66 is stopped. The master cylinder pressure is transferred to the wheel cylinders 23 FR and 23 FL for the front wheels, and the regulator pressure is transferred to the wheel cylinders 23 RR and 23 RL for the rear wheels. With this control, even if a malfunction occurs, a sufficient amount of braking force may be reliably applied to each wheel.

Conventionally, after detecting the deviation of the wheel cylinder pressure from the target hydraulic pressure, the brake ECU 70 switches the control mode from the cooperative braking control mode to the system partition mode. This is because the valve opening pressure when the valve is closed is prescribed in order to avoid the situation where the control valve is opened due to the differential pressure acting force that is applied when the valve is closed in the envisioned use environments, and opening/closing of the control valve is controlled by supplying or interrupting a control current having a prescribed magnitude at which the prescribed valve opening pressure is reliably achieved. Namely, when the cooperative braking control is properly executed, neither the master cut valve 64 nor the regulator cut valve 65 is opened. The valve opening pressure means the pressure difference between the upstream side and the downstream side of the electromagnetically controlled valve when the electromagnetically controlled valve is opened due to the differential pressure acting force applied to the electromagnetically controlled valve when it is closed.

However, according to the embodiment of the invention, the brake ECU 70 executes control to make the valve opening pressure for the valve lower than the prescribed valve opening pressure so that the valve is mechanically opened due to the differential pressure acting force applied to the valve when the valve is closed in the envisioned use environments. The valve opening pressure for the control valve is adjusted by changing the magnitude of control current supplied to the electromagnetically controlled valve. Accordingly, the brake ECU 70 supplies a medium current having a smaller magnitude than the control current to the master cut valve 64 and the regulator cut valve 65 while these valves 64 and 65 need to be closed. Because the medium current is smaller in magnitude than the control current, the power consumption in the master cut valve 64 and the regulator cut valve 65 is suppressed.

If the wheel cylinder pressure decreases due to, for example, occurrence of a malfunction, the pressure of the brake fluid downstream of the master cut valve 64 or the regulator cut valve 65 is decreased, and the pressure difference between the upstream side and the downstream side of the master cut valve 64 or the regulator cut valve 65 temporarily increases and exceeds the valve opening pressure that is controlled due to supply of the medium current, the master cut valve 64 or the regulator cut valve 65 is mechanically opened even before the brake ECU 70 issues an instruction to interrupt the control current. Then, the brake fluid is supplied from the master cylinder unit 27 to the wheel cylinders 23 so that the pressure difference between the upstream side and the downstream side of the master cut valve 64 or the regulator cut valve 65 decreases to the controlled valve opening pressure. Accordingly, the deviation of the wheel cylinder pressure from the target hydraulic pressure is reduced by mechanically opening the master cut valve 64 or the regulator cut valve 65 before the brake ECU 70 finishes the determination as to whether a malfunction has occurred. As a result, the fail-safe properties of the braking force control improve, and the brake control apparatus having higher reliability is provided.

In this case, if the master cut valve 64 opens before the regulator cut valve 65 opens, the brake fluid stored in the master cylinder 32 is supplied to the wheel cylinders 23 for the front wheels and the rear wheels. This results in the situation where the brake fluid from the master cylinder 32 is unfavorably supplied to the wheel cylinders 23 RR and 23 RL for the rear wheels that should be supplied with the brake fluid from the regulator 33. If the brake pedal is operated, the flow of the brake fluid from the reservoir 34 to the master cylinder 32 is interrupted. Accordingly, the amount of brake fluid that can be delivered from the master cylinder 32 to the wheel cylinders 23 is limited by the capacity of the hydraulic chamber of the master cylinder 32. After it is determined that a malfunction has occurred and the partition valve 60 is closed, the master cylinder 32 is the only brake fluid supply source for the wheel cylinders 23 FR and 23 FL at the front wheels in the embodiment of the invention. The braking force allocated to the front wheels is set to be greater than the braking force allocated to the rear wheels. Accordingly, in order to efficiently generate the braking force in the system partition mode after it is determined that a malfunction has occurred, it is preferable to maintain the brake fluid in the master cylinder 32 that is the source of the hydraulic pressure for the front wheels, which greatly contributes to braking of the vehicle, instead of supplying the brake fluid from the master cylinder 32 to the wheel cylinders 23 RR and 23 RL for the rear wheels.

According to the embodiment of the invention, the brake fluid from the master cylinder 32 starts to be supplied to the wheel cylinders 23 after the brake fluid from the regulator 33 starts to be supplied to the wheel cylinders 23. Accordingly, the regulator 33 is mechanically communicated with the wheel cylinders 23 before the master cylinder 32 is communicated with the wheel cylinders 23. More specifically, the brake ECU 70 controls the valve opening pressures for the regulator cut valve 65 and the master cut valve 64 so that the regulator cut valve 65 is mechanically opened before the master cut valve 64 is opened when the pressure difference between the upstream side and the downstream side of each valve increases.

Unlike the master cylinder 32, the regulator 33 may be supplied with the brake fluid from the power hydraulic pressure source 30 even when the brake pedal is being operated. Accordingly, there is a relatively greater margin of the amount of brake fluid that can be delivered from the regulator 33 to the wheel cylinders 23. Accordingly, the deviation of the wheel cylinder pressure from the target pressure is promptly reduced by using the brake fluid in the regulator 33, whereby the consumption of the brake fluid in the master cylinder 32 is reduced and the brake fluid in the master cylinder 32 remains available for the supply to the master cylinders 32 for the front wheels.

The control of the valve opening pressures for the master cut valve 64 and the regulator cut valve 65, namely, the control of the medium current will be described below. In order to set the value of the medium current, first, the values of the brake pedal depression forces at which the master cut valve 64 and the regulator cut valve 65 are allowed to mechanically open are set. Hereinafter, such brake pedal depression force will be referred to as the valve opening brake pedal depression force. The valve opening brake pedal depression force for the master cut valve 64 is set to a value greater than the valve opening brake pedal depression force for the regulator cut valve 65. The valve opening pressures for the master cut valve 64 and the regulator cut valve 65, which are required to maintain the valve opening brake pedal depression forces for the master cut valve 64 and the regulator cut valve 65, are set, respectively, based on the set valve opening brake pedal depression forces. Then, the value of the medium current required to achieve the required valve opening pressure is calculated.

Figure 2:
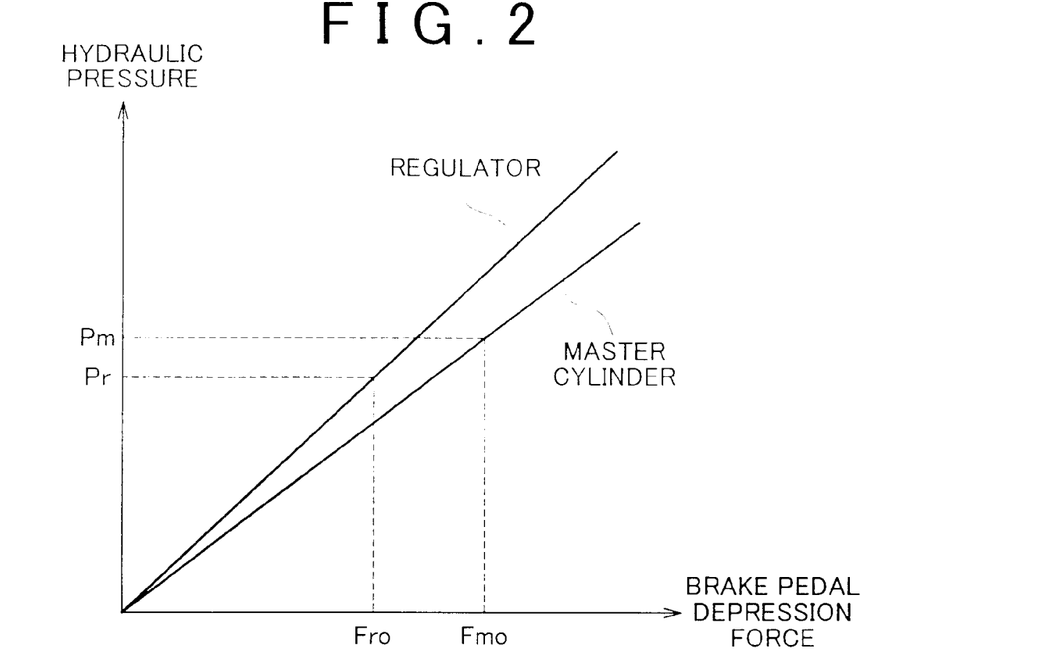
FIG. 2 is the graph showing an example of the relationship between the brake pedal depression force and the hydraulic pressure generated by depressing a brake pedal in the brake control apparatus according to the embodiment of the invention.

FIG. 2 is the graph showing an example of the relationship between the brake pedal depression force and the hydraulic pressure generated by depressing the brake pedal in the brake control apparatus 20 according to the embodiment of the invention. FIG. 2 shows the relationship between the applied brake pedal depression force and the hydraulic pressure generated on the upstream side of the regulator cut valve 65 when the valve 65 is closed. FIG. 2 also shows the relationship between the applied brake pedal depression force and the hydraulic pressure generated on the upstream side of the master cut valve 64 when the valve 64 is closed. The depression force and the hydraulic pressure have substantially linear relationship. In the embodiment of the invention, the hydraulic pressure in the regulator 33 is higher than the hydraulic pressure in the master cylinder 32 by, for example, approximately 5%. In FIG. 2, the difference in the characteristics of the regulator 33 and the master cylinder 32 is slightly exaggerated to facilitate the understanding.

First, the valve opening brake pedal depression force $F_{r0}$ for the regulator cut valve 65 is set. The valve opening brake pedal depression force $F_{r0}$ for the regulator cut valve 65 may be appropriately set by experiment, etc. in accordance with the amount of heat generated by supplying electric power while the valve is closed and the frequency at which the valve is mechanically opened and closed due to an increase in the brake pedal depression force. Preferably, the valve opening brake pedal depression force is set to a small value to reduce the amount of heat generated. Meanwhile, the valve opening brake pedal depression force is preferably set to a great value to prevent the valve from mechanically opened and closed excessively frequently. When the valve opening brake pedal depression force $F_{r0}$ is set, the required valve opening pressure Pr for the regulator cut valve 65 is set based on the characteristics shown in FIG. 2.

Next, the valve opening brake pedal depression force $F_{m0}$ for the master cut valve 64 is set. The valve opening brake pedal depression force $F_{m0}$ for the master cut valve 64 is set to a value greater than the valve opening brake pedal depression force $F_{r0}$. The valve opening brake pedal depression force $F_{m0}$ for the master cut valve 64 is calculated by adding an appropriate margin to the valve opening brake pedal depression force $F_{r0}$ for the regulator cut valve 65. Preferably, the margin is set to a value at which it is possible to avoid inversion of the magnitude correlation between the valve opening brake pedal depression force $F_{r0}$ and the valve opening brake pedal depression force $F_{m0}$ due to the variations therein that are estimated to occur during use of these valves. The variation in the valve opening brake pedal depression force may occur due to the variation in the magnitude of attraction force of the solenoid generated while electric power is supplied to a cut valve or the manufacturing variation in the components that form the cut valve. When the valve opening brake pedal depression force $F_{m0}$ is set, the required valve opening pressure Pm for the master cut valve 64 is set based on the characteristics shown in FIG. 2.

Because the valve opening brake pedal depression force $F_{m0}$ for the master cut valve 64 is set to be greater than the valve opening brake pedal depression force $F_{r0}$ for the regulator cut valve 65, the required valve opening pressure Pm for the master cut valve 64 is generally greater than the required valve opening pressure Pr for the regulator cut valve 65, as shown in FIG. 2. The required valve opening pressure for the master cut valve 64 is not always higher than the required valve opening pressure for the regulator cut valve 65 when the regulator pressure is frequently higher than the master cylinder pressure. The required valve opening pressure Pm for the master cut valve 64 may be lower than the required valve opening pressure Pr for the regulator cut valve 65.

Figure 3:
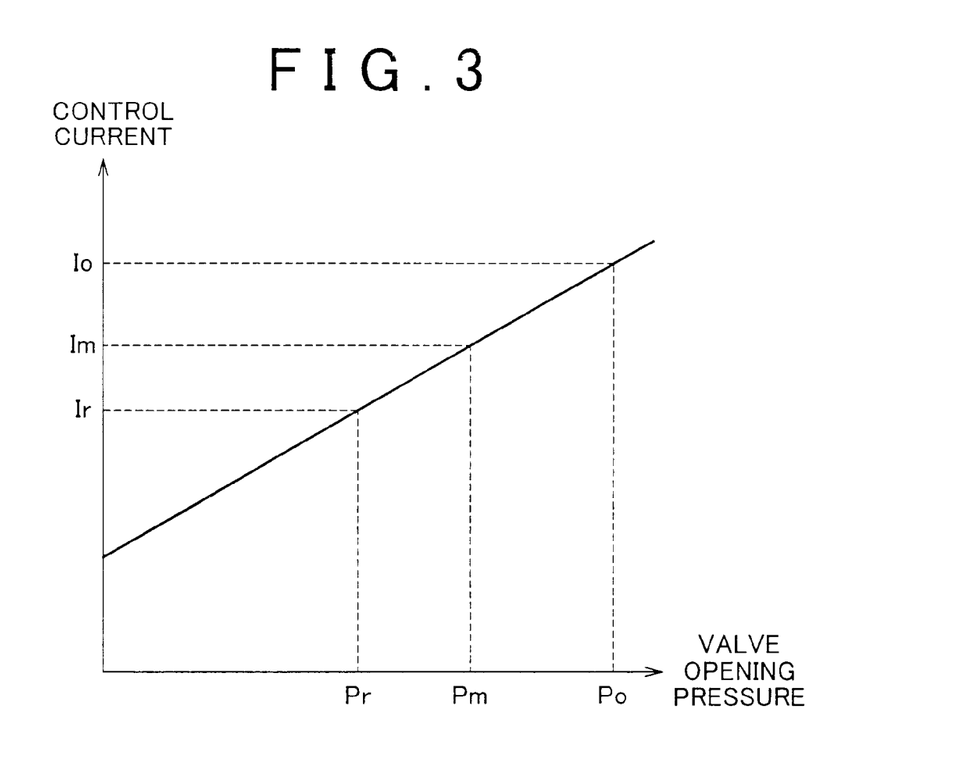
FIG. 3 is the graph showing an example of the relationship between the valve opening pressure for a master cut valve/a regulator cut valve and the required current value according to the embodiment of the invention.

When the required valve opening pressure Pm for the master cut valve 64 and the required valve opening pressure Pr for the regulator cut valve 65 are set, the medium currents Im and Ir that are required to maintain the required valve opening pressures Pm and Pr, respectively, are set. FIG. 3 is the graph showing an example of the relationship between the valve opening pressure for each of the master cut valve 64 and the regulator cut valve 65 and the required current value according to the embodiment of the invention. As shown in FIG. 3, the valve opening pressure for each of the master cut valve 64 and the regulator cut valve 65 and the required current value have a linear relationship. Because both the master cut valve 64 and the regulator cut valve 65 are normally open electromagnetically controlled valves, even if the valve opening pressure is maintained at zero in order to oppose the elastic force of the return spring provided in the valve, a control current having a prescribed magnitude must be supplied. In the embodiment of the invention, the relationship between the valve opening pressure for the master cut valve 64 and the control current value is the same as the relationship between the valve opening pressure for the regulator cut valve 65 and the control current value. However, the relationship may be made different between the master cut valve 64 and the regulator cut valve 65 when needed.

The medium current Im that is supplied to the master cut valve 64 and the medium current Ir that is supplied to the regulator cut valve 65 are calculated based on the required valve opening pressure Pm for the master cut valve 64 and the required valve opening-pressure Pr for the regulator cut valve 65, respectively, using the characteristics shown in FIG. 3. In the embodiment of the invention, each of the medium currents Im and Ir is a uniform current valve that does not fluctuate with time. When the solenoid seal area is S, the solenoid attraction force is F1, and the return spring force is F2, the differential pressure P applied to the electromagnetically controlled valve is expressed by the equation, $P=(F1-F2)/S$. The solenoid attraction force F1 is proportional to the control current supplied to the control valve. The solenoid seal area S and the return spring force F2 may be adjusted in order to reduce the medium currents Im and Ir to reduce the power consumption and the amount of heat generated. To reduce the power consumption and the amount of heat generated, the slope of the straight line shown in FIG. 2 may be adjusted by adjusting the characteristics of a hydraulic pressure booster.

Generally, each of the master cut valve 64 and the regulator cut valve 65 is a normally open electromagnetically controlled valve that is closed at the valve opening pressure $P_0$ when supplied with the control current $I_0$ having a prescribed magnitude at which the valve is reliably kept closed in the environments in which these valve may be used, and that is open while the supply of the control current is interrupted. The prescribed control current $I_0$ and the valve opening pressure $P_0$ are set so that the master cut valve 64 and the regulator cut valve 65 are kept closed even if the greatest brake pedal depression force that is estimated to be generated during use of the vehicle is applied. However, as shown in FIG. 3, according to the embodiment of the invention, the brake ECU 70 supplies the medium currents Im and Ir both of which are smaller in magnitude than the control current $I_0$ to the master cut valve 64 and the regulator cut valve 65 while the master cut valve 64 and the regulator cut valve 65 need to be kept closed, respectively. Because each of the medium currents Im and Ir is smaller in magnitude than the control current $I_0$, the power consumption in the master cut valve 64 and the regulator cut valve 65 is suppressed.

Figure 4A:
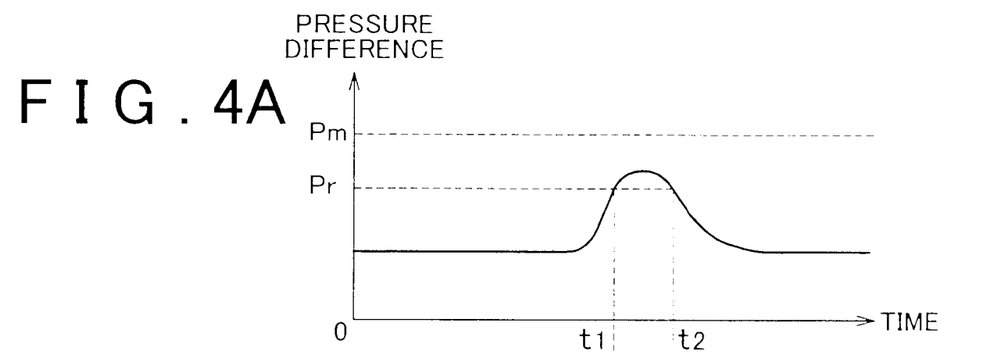
FIG. 4A is the graph showing an example of a change in the pressure difference between the upstream side and the downstream side of each of the master cut valve and the regulator cut valve.
Figure 4B:
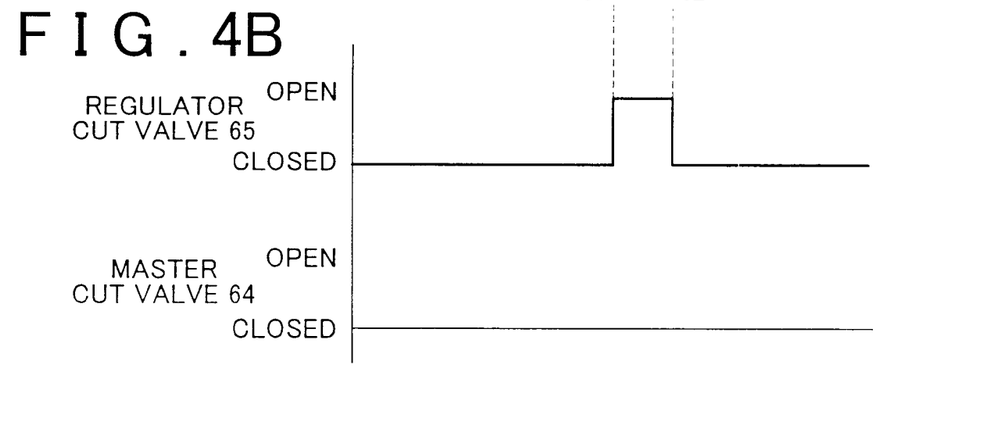
FIG. 4B is the graph showing the open/closed state of each of the master cut valve and the regulator cut valve with respect to the change in the pressure difference.
Figure 4C:
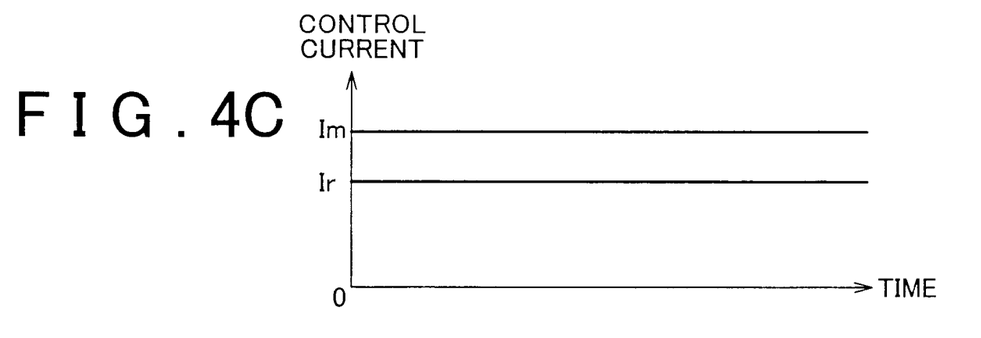
FIG. 4C is the graph showing control currents supplied to the master cut valve and the regulator cut valve.

The operation of the master cut valve 64 and the regulator cut valve 65 during the cooperative braking control according to the embodiment of the invention will be described with reference to FIG. 4, on the assumption that the medium currents Im and Ir that should be supplied to the master cut valve 64 and the regulator cut valve 65, respectively, while they are closed have been set. FIGS. 4A, 4B and 4C are the graphs illustrating the operation of the master cut valve 64 and the regulator cut valve 65 during the cooperative braking control according to the embodiment of the invention. The FIG. 4A shows an example of a change in the pressure difference between the upstream side and the downstream side of each of the master cut valve 64 and the regulator cut valve 65 with time. In order to facilitate the understanding, such a change is shown on the assumption that the master cylinder pressure and the regulator pressure are equal to each other. The FIG. 4B shows the open/closed state of each of the master cut valve 64 and the regulator cut valve 65 with respect to a change in the pressure difference. The FIG. 4C shows the control currents supplied to the master cut valve 64 and the regulator cut valve 65, namely, the medium currents Im and Ir.

During the cooperative braking control, the uniform medium current Im is supplied to the master cut valve 64 and the uniform medium current Ir is supplied to the regulator cut valve 65 by the brake ECU 70 so that the master cut valve 64 and the regulator cut valve 65 are both closed. However, if the pressure difference between the upstream side and the downstream side of the cut valve increases due to, for example, occurrence of a malfunction and the pressure difference temporarily exceeds the required valve opening pressure Pr for the regulator cut valve 65 at, for example, time $t_1$, the differential pressure acting force is greater than the electromagnetic force generated due to a supply of the medium current Ir. Accordingly, the regulator cut valve 65 is mechanically opened at time $t_1$.

As a result, the brake fluid is supplied from the regulator 33 to the wheel cylinders 23 through the open regulator cut valve 65. Then, the pressure difference between the upstream side and the downstream side of the regulator cut valve 65 decreases and becomes equal to the pressure value Pr at, for example, time $t_2$. If the pressure difference between the upstream side and the downstream side of the regulator cut valve 65 decreases to the pressure Pr, the differential pressure acting force that is applied to the regulator cut valve 65 is reduced, the regulator cut valve 65 is not kept open and the regulator cut valve 65 closes. Then, the regulator cut valve 65 is mechanically closed. Until the control mode switches to the system partition control mode, the regulator cut valve 65 is mechanically opened each time the pressure difference between the upstream side and the downstream side of the regulator cut valve 65 exceeds the required valve opening pressure.

In the case shown in FIG. 4A, because the pressure difference between the upstream side and the downstream side of the master cut valve 64 has not reached the required valve opening pressure Pm for the master cut valve 64, the master cut valve 64 is kept closed. If the pressure difference between the upstream side and the downstream side of the master cut valve 64 reaches the required valve opening pressure Pm for the master cut valve 64, the differential pressure acting force is greater than the electromagnetic force generated due to the supply of the medium current Im. Accordingly, as in the case of the regulator cut valve 65, the master cut valve 64 is also mechanically opened.

Figure 5:
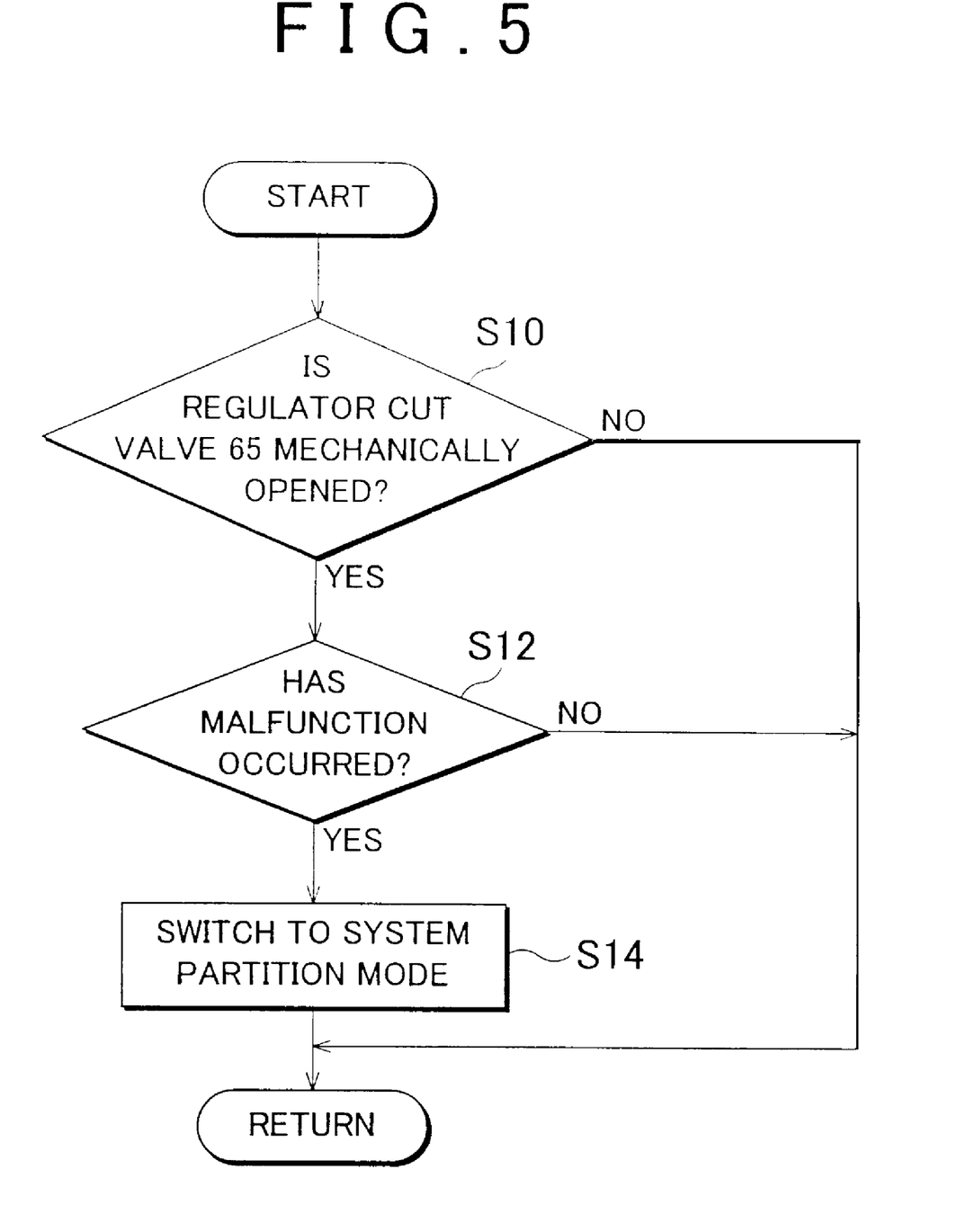
FIG. 5 is the flowchart for describing the routine executed to switch the control mode from the cooperative braking control mode to the system partition mode.

FIG. 5 is the flowchart for describing the routine executed when the control mode switches from the cooperative braking control mode to the system partition mode. The brake ECU 70 periodically executes the routine shown in FIG. 5 at appropriate time intervals, for example, at time intervals of several milliseconds during the cooperative braking control.

When the routine shown in FIG. 5 is started, the brake ECU 70 first determines whether the regulator cut valve 65 is mechanically opened (S10). Such determination may be made based, for example, on whether the pressure-increasing linear control valve 66 and the pressure-decreasing linear control valve 67 are open or closed. If the regulator cut valve 65 is open, the brake fluid flows from the regulator 33 to the wheel cylinders 23 and the wheel cylinder pressure tends to increase. In order to suppress an increase in the wheel cylinder pressure to maintain a predetermined control hydraulic pressure, the brake ECU 70 closes the pressure-increasing linear control valve 66. In addition, the brake ECU 70 controls the opening amount of the pressure-decreasing linear control valve 67 to discharge the brake fluid flowing in the second passage 45b through the regulator cut valve 65. The brake ECU 70 detects the mechanical opening of the regulator cut valve 65 by detecting the opening of pressure-decreasing linear control valve 67 that occurs when the wheel cylinder pressure should be maintained. The brake ECU 70 determines whether the pressure-decreasing linear control valve 67 is open or closed in accordance with the amount of current supplied to the pressure-decreasing linear control valve 67.

A valve opening/closing detection mechanism such as a switch that determines whether the regulator cut valve 65 is open or closed may be provided, and the brake ECU 70 may determine whether the regulator cut valve 65 is mechanically opened in accordance with the output from the valve opening/closing detection mechanism. Thus, it is possible to more reliably determine whether the regulator cut valve 65 is open or closed. In the viewpoint of reduction in the production cost for the brake control apparatus, it is preferable to determine whether the regulator cut valve 65 is open or closed in accordance with the amount of current supplied to the pressure-decreasing linear control valve 67 instead of providing the valve opening/closing detection mechanism.

In addition to determining as to whether the regulator cut valve 65 is open or closed, the brake ECU 70 may determine whether the master cut valve 64 is mechanically opened or not. In the embodiment of the invention, the control current is adjusted so that the regulator cut valve 65 is opened basically before the master cut valve 64 is opened. However, there is a possibility that the master cut valve 64 is opened before the regulator cut valve 65 is opened depending on how the control current is adjusted.

If it is determined that the regulator cut valve 65 is mechanically opened ("YES" in S10), the brake ECU 70 determines whether any malfunctions have occurred in the brake control apparatus 20 (S12). Examples of malfunctions include a delay in response or poor control detected based on the measured values from the control pressure sensor 73. When each sensor has self-checking function, a malfunction detected by the self-checking executed by each sensor is also regarded as a malfunction.

If it is determined that a malfunction has occurred in the brake control apparatus 20 ("YES" in S12), the brake ECU 70 switches the control mode from the cooperative braking control mode to the system partition mode (S14). This is because there is a possibility that the regulator cut valve 65 is mechanically opened due to a decrease in the wheel cylinder pressure caused by the detected malfunction. In such a case, the cooperative braking control is stopped, and the control mode switches to the system partition mode. When the control mode switches to the system partition mode, the brake ECU 70 interrupts the supply of the medium current Im and Ir to the master cut valve 64 and the regulator cut valve 65 to open these cut valves, respectively. In addition, the brake ECU 70 interrupts supply of the control current to the partition valve 60 to close the partition valve 60 so that the main passage 45 is partitioned into the first passage 45a on the master cylinder 32 side and the second passage 45b on the regulator 33 side.

On the other hand, when it is determined that the regulator cut valve 65 is kept closed ("NO" in step S10) or that there is no malfunction in the brake control apparatus 20 ("NO" in S12), the brake ECU 70 ends the routine without switching the control mode to the system partition mode.

In the embodiment of the invention, the brake fluid may be supplied to the wheel cylinders 23 by mechanically opening the regulator cut valve 65 while the wheel cylinder pressure is controlled by the wheel cylinder pressure control system. The regulator cut valve 65 is mechanically opened in accordance with the pressure difference between the upstream side and the downstream side of the regulator cut valve 65 even before the brake ECU 70 issues an instruction to interrupt the control current. Accordingly, even if the start of the control on the wheel cylinder pressure control system, etc. executed by the brake ECU 70 is delayed, the influence of such delay is reduced. According to the embodiment described above, a change in the required braking force caused, for example, by the operation of the brake pedal is promptly transferred to the wheel cylinders 23, and the braking force is promptly changed in response to the brake pedal operation. As a result, the brake control apparatus having higher reliability is provided.

When the wheel cylinder pressure decreases and the pressure of the brake fluid downstream of the regulator cut valve 65 is reduced due to, for example, occurrence of a malfunction, the pressure difference between the upstream side and the downstream side of the regulator cut valve 65 may temporarily increase and exceed the valve opening pressure Pr that is controlled by a supply of the medium current Ir. In this case as well, the regulator cut valve 65 is mechanically opened to allow the brake fluid that is supplied from the regulator 33 to the wheel cylinders 23 so that the pressure difference between the upstream side and the downstream side of the regulator cut valve 65 decreases to the required valve opening pressure Pr. Accordingly, even if the start of the control is delayed, the influence of such delay is reduced by mechanically opening the regulator cut valve 65, and, therefore, the fail-safe properties of the braking force control improve. As a result, the brake control apparatus having higher reliability is provided.

According to the embodiment of the invention, when the wheel cylinder pressure deviates from the target pressure, first, the regulator cut valve 65 is mechanically opened. Then, if it is determined that a malfunction has occurred, the control mode switches to the system partition mode, and the master cut valve 64 is opened. Namely, after the brake fluid from the regulator 33 starts to be supplied, the system is partitioned into the system on the regulator 33 side and the system on the master cylinder 32 side. After such partition, the brake fluid from the master cylinder 32 starts to be supplied. As a result, the brake fluid from the master cylinder 32 starts to be supplied to the wheel cylinders 23 after the brake fluid from the regulator 33 starts to be supplied to the wheel cylinders 23.

According to the embodiment of the invention, the brake ECU 70 controls the medium currents Im and If supplied to the master cut valve 64 and the regulator cut valve 65, respectively, whereby the valve opening pressures for these valves are controlled so that the regulator cut valve 65 is mechanically opened before the master cut valve 64 is opened. With this control as well, the brake fluid from the master cylinder 32 starts to be supplied to the wheel cylinders 23 after the brake fluid from the regulator 33 starts to be supplied to the wheel cylinders 23.

Unlike the master cylinder 32, the regulator 33 may be supplied with the brake fluid from the power hydraulic pressure source 30 even during the operation of the brake pedal. Accordingly, there is a relatively great margin of the amount of brake fluid that can be delivered from the regulator 33 to the wheel cylinders 23. Therefore, it is possible to reduce the consumption of the brake fluid in the master cylinder 32 and maintain the brake fluid in the master cylinder 32 for the supply to wheel cylinders 23 for the front wheels by promptly reducing the deviation of the wheel cylinder pressure from the target pressure using the brake fluid from the regulator 33. It is possible to suppress the delivery of the brake fluid from the master cylinder 32 before the control mode switches to the system partition mode. Accordingly, a greater amount of hydraulic fluid is maintained in the master cylinder 32. It is, therefore, possible to reduce the possibility that the amount of brake fluid supplied to wheel cylinders 23 for the front wheels, which greatly contributes to the braking of the vehicle, is insufficient after the control mode switches to the system partition mode, namely, after the partition valve 60 is closed. As a result, the fail-safe properties of the brake control further improve.

While the invention has been described with reference to the example embodiment thereof, it is to be understood that the invention is not limited to the example embodiment. To the contrary, the invention is intended to cover various modifications and equivalent arrangements. In addition, the various elements of the example embodiment shown in various combinations and configurations, which are exemplary, other combinations and configurations, including more, less or only a single element, are also within the scope of the invention. Hereafter, modified examples of the embodiment of the invention will be described.

According to the embodiment of the invention, each of the medium currents Im and Ir supplied to the master cut valve 42 that serves as the first check valve and the regulator cut valve 65 that serves as the second check valve, respectively, is a uniform valve, and the valve opening pressure is constant. Instead of this, the controller may vary the valve opening pressures for the first check valve and the second check valve.

For example, the brake ECU 70 may control the medium current Im so that the valve opening pressure for the master cut valve 64 changes as the master cylinder pressure changes. The brake ECU 70 controls the medium current Im to make the valve opening pressure for the master cut valve 64 higher than the master cylinder pressure so that the master cut valve 64 does not open before the regulator cut valve 65 opens. More specifically, the brake ECU 70 increases or decreases the medium current Im in accordance with increases/decreases in the master cylinder pressure. For example, the brake ECU 70 increases the medium current Im as the master cylinder pressure increases. Thus, when the brake pedal depression force is small and the master cylinder pressure is low, the value of the medium current Im is also made small. Accordingly, power consumption in the master cut valve 64 is suppressed more efficiently than when the medium current Im is constantly maintained. In this case, the brake ECU 70 may convert the measured value from the regulator pressure sensor 71 into the master cylinder pressure. Alternatively, a master cylinder pressure measuring sensor may be provided on the master passage 61, and the master cylinder pressure may be measured by the master cylinder pressure measuring sensor.

The brake ECU 70 may change the medium current Im in accordance with a change in the pressure difference between the upstream side and the downstream side of the master cut valve 64 instead of changing the medium current Im in accordance with a change in the master cylinder pressure. In this case, the brake ECU 70 may calculate the differential pressure applied to the master cut valve 64 by calculating the difference between the master cylinder pressure obtained based on the measured value from the regulator pressure sensor 71 and the measured value from the control pressure sensor 73.

The brake ECU 70 may change not only the valve opening pressure for the master cut valve 64 but also the valve opening pressure for the regulator cut valve 65. In this case, the relationship between the current supplied to the master cult valve 64 and the valve opening pressure for the master cut valve 64 and the relationship between the current supplied to the regulator cut valve 65 and the valve opening pressure for the regulator cut valve 65 may be measured in advance, for example, when the vehicle is produced or shipped, and stored in the brake ECU 70. According to the embodiment of the invention described above, the valve opening brake pedal depression force $F_{m0}$ for the master cut valve 64 is calculated by adding a margin to the valve opening brake pedal depression force $F_{r0}$ for the regulator cut valve 65 in consideration of variations in the cut valves caused during production. If the relationship between the current supplied to each cut valve and the valve opening pressure is measured in advance, it is possible to use a smaller margin to calculate the valve opening brake pedal depression force $F_{m0}$. As a result, it is possible to set the valve opening brake pedal depression force $Fm_0$ for the master cut valve 64 to a lower value, and, therefore, reduce the power consumption in the master cut valve 64.

In the embodiment of the invention, the invention operates during the cooperative braking control. However, the invention is not limited to the operation with the regenerative braking force. The invention may operates during the control of the wheel cylinder pressure using the brake fluid supplied from the power hydraulic pressure source 30 through the pressure-increasing linear control valve 66, for example, vehicle stability control (VSC) for stabilizing the behavior of a vehicle, traction control (TRC) executed in a FF vehicle, or brake assist (BA) control for brake assist. The VSC is executed to suppress a side skid of a wheel that may occur when the vehicle is turning. The TRC is executed to suppress spinning of the driving wheels that is likely to occur when the vehicle starts or accelerates. The BA control is executed to supplement the pedal depression force when the brake pedal is depressed suddenly.

The invention may be applied also to a typical brake control apparatus including a front system and a rear system. In this case, preferably, the system required to generate a greater braking force is communicated with the wheel cylinders after the system required to generate a less braking force is communicated with the wheel cylinders. For example, when the front system is required to generated a greater braking force, the controller controls the valve opening pressures for the master cut valves of the front system and the rear system so that the master cut valve for the rear system is mechanically opened before the master cut valve for the front system is opened.

Another modified example in which the invention is realized when the partition valve 60 is closed will be described. Even if the master cut valve 64 is opened, the brake fluid does not flow from the master cylinder 32 to the system on the regulator 33 side as long as the partition valve 60 is closed. Accordingly, the valve opening pressure for the master cut valve 64 is controlled with the valve opening pressure of the partition valve 60 taken into account. Namely, the brake ECU 70 controls the valve opening pressures for the control valves so that the regulator cut valve 65 is mechanically opened before the partition valve 60 and the master cut valve 64 are mechanically opened due to a pressure difference. Thus, it is possible to set the valve opening pressure for the master cut valve 64 to a lower value. As a result, the power consumption in the master cut valve 64 is reduced.

The modified example is preferably employed when the brake control apparatus 20 shown in FIG. 1 is used for the traction control on a FR vehicle and the braking force is controlled by the wheel cylinders 23 RR and 23 RL for the rear wheels. This is because, in the brake control apparatus 20, if the partition valve 60 and the master cut valve 64 are closed, the wheel cylinders 23 FR and 23 FL for the front wheels are shut off from both the power hydraulic pressure source 30 and the master cylinder unit 27.

When a brake pedal operation is detected during the TRC, the TRC is stopped and the normal braking control is executed. A brake pedal operation is detected by one of or both the operation of a pedal switch provided at the brake pedal 24 and an increase in the master cylinder pressure. When a malfunction has occurred in the system for detecting a brake pedal operation, for example, when a malfunction has occurred in the pedal switch, detection of the brake pedal operation may be delayed. If detection of the brake pedal operation is delayed, the master cylinder pressure may be relatively high due to the brake pedal operation. Accordingly, the valve opening pressure for the master cut valve 64 is controlled in accordance with the valve opening pressure for the partition valve 60 as described above, whereby delivery of the brake fluid from the master cylinder 32 is suppressed.

What is claimed is:

1. A brake control apparatus, comprising:
   a plurality of wheel cylinders that each apply braking force to one of a plurality of wheels when supplied with a hydraulic fluid;
   a wheel cylinder pressure control system that controls a wheel cylinder pressure independently of an operation of a brake operating member, wherein the wheel cylinder pressure is a pressure of the hydraulic fluid supplied to the wheel cylinders;
   a manual hydraulic pressure source that includes
      a first hydraulic pressure source which pressurizes a hydraulic fluid stored in a hydraulic chamber of the first hydraulic pressure source in accordance with an operation amount of the brake operating member, and
      a second hydraulic pressure source that includes a regulator that adjusts a pressure of a hydraulic fluid stored in a hydraulic chamber of the second hydraulic pressure source in accordance with the pressure of the hydraulic fluid in the hydraulic chamber of the first hydraulic pressure source;
   a hydraulic fluid supply path that connects the manual hydraulic pressure source to the wheel cylinders; and
   a controller that controls a manner in which the hydraulic fluid is supplied to the wheel cylinders,
   wherein:
   communication between the manual hydraulic pressure source and the wheel cylinders through the hydraulic fluid supply path is interrupted when the wheel cylinder pressure control system controls the wheel cylinder pressure, and the communication between the manual hydraulic pressure source and the wheel cylinders through the hydraulic fluid supply path is permitted so that the hydraulic fluid is supplied from the manual hydraulic pressure source to the wheel cylinders when the wheel cylinder pressure deviates from a target pressure, and
   when the wheel cylinder pressure deviates from the target pressure, the controller controls the manner in which the hydraulic fluid is supplied to the wheel cylinders so that the hydraulic fluid from the second hydraulic pressure source is initially supplied to each of the plurality of wheel cylinders and the hydraulic fluid from the first hydraulic pressure source is not supplied to any of the plurality of wheel cylinders, then the hydraulic fluid from the second hydraulic pressure source is supplied to both a first predetermined group and a second predetermined group of wheel cylinders of the plurality of wheel cylinders and the hydraulic fluid from the first hydraulic pressure source is supplied to only the second predetermined group of wheel cylinders of the plurality of wheel cylinders.

2. The brake control apparatus according to claim 1, wherein:
   the wheel cylinders includes a first wheel cylinder, provided at a wheel among the plurality of wheels, to which a first braking force is allocated, and a second wheel cylinder, provided at a second wheel among the plurality of wheels, to which a braking force less than the first braking force applied by the first wheel cylinder is allocated;
   the hydraulic fluid supply path includes a first supply path that connects the first hydraulic pressure source to the first wheel cylinder, and a second supply path that connects the second hydraulic pressure source to the second wheel cylinder, and the hydraulic fluid supply path is provided with a partition valve that is provided at a middle portion of a passage that connects the first supply path to the second supply path and that partitions the hydraulic fluid supply path into the first supply path and the second supply path when the partition valve is closed; and
   the controller closes the partition valve after the hydraulic fluid from the second hydraulic pressure source starts to be supplied in order to partition the hydraulic fluid supply path into the first supply path and the second supply path so that the first wheel cylinder is supplied with the hydraulic fluid from the first hydraulic pressure source and the second wheel cylinder is supplied with the hydraulic fluid from the second hydraulic pressure source.

3. The brake control apparatus according to claim 2, wherein:
   the hydraulic fluid supply path includes a first cut off valve provided on the first supply path and a second cut off valve provided on the second supply path, and
   when the wheel cylinder pressure control system controls the wheel cylinder pressure, the controller closes both the first cut off valve and the second cut off valve, and when a pressure difference between an upstream side and a downstream side of the first cut off valve or the second cut off valve increases, the controller controls a valve opening pressure for the first cut off valve and a valve opening pressure for the second cut off valve so that the second cut off valve is mechanically opened before the first cut off valve is opened.

4. The brake control apparatus according to claim 3, wherein:
   each of the first cut off valve and the second cut off valve is a normally open electromagnetically controlled valve that is kept closed by an electromagnetic force generated when the electromagnetically controlled valve is supplied with a control current having a prescribed magnitude, and that is open when a supply of the control current is interrupted; and
   the controller supplies a medium current having a smaller magnitude than the control current to each of the first cut off valve and the second cut off valve while the first cut off valve and the second cut off valve need to be kept closed.

5. The brake control apparatus according to claim 4, wherein:
   the controller varies the medium current that is supplied when each of the first cut off valve and the second cut off valve is closed in accordance with the pressure difference between the upstream side and the downstream side of each of the first cut off valve and the second cut off valve or the pressure of the hydraulic fluid upstream side of each of the first cut off valve and the second cut off valve.

6. The brake control apparatus according to claim 4, wherein the medium current supplied to the first cut off is not the same as the medium current supplied to the second cut off valve.

7. The brake control apparatus according to claim 4, wherein the medium current supplied to the first cut off is greater than the medium current supplied to the second cut off valve.

8. The brake control apparatus according to claim 4, wherein the medium current supplied to the first cut off is less than the medium current supplied to the second cut off valve.

9. The brake control apparatus according to claim 2, wherein:
   the hydraulic fluid supply path is further provided with a first cut off valve provided on the first supply path and a second cut off valve provided on the second supply path; and
   when the partition valve is closed, the controller controls a valve opening pressure for the first cut off valve and a valve opening pressure for the second cut off valve in accordance with a valve opening pressure for the partition valve.

10. The brake control apparatus according to claim 2, wherein the first wheel cylinder applies the brake force to a front wheel among the plurality of wheels, and the second wheel cylinder applies the brake force to a rear wheel among the plurality of wheels.

11. The brake control apparatus according to claim 1, wherein, when the wheel cylinder pressure deviates from the target pressure, the controller controls the manner which the hydraulic fluid is supplied to the wheel cylinders so that the second hydraulic pressure source initially supplies hydraulic fluid to each of the plurality of wheel cylinders and the first hydraulic pressure source does not supply hydraulic fluid to any of the plurality of wheel cylinders, then the second hydraulic pressure source supplies hydraulic fluid to only a first predetermined group of wheel cylinders of the plurality of wheel cylinders and the first hydraulic pressure source supplies hydraulic fluid to only a second predetermined group of wheel cylinders of the plurality of wheel cylinders.

12. The brake control apparatus according to claim 11, wherein the first predetermined group of wheel cylinders each apply braking force to rear wheels from among the plurality of wheels when supplied with the hydraulic braking fluid, and wherein the second predetermined group of wheel cylinders each apply braking force to front wheels from among the plurality of wheels when supplied with the hydraulic braking fluid.

13. The brake control apparatus according to claim 11, wherein a braking force allocated to the first predetermined group of wheel cylinders is less than a braking force allocated to the second predetermined group of wheel cylinders.

14. The brake control apparatus according to claim 1, further comprising:
   a power hydraulic pressure source that pressurizes hydraulic fluid in the power hydraulic pressure source when supplied with power; and
   a reservoir that stores the hydraulic fluid which is supplied to the first hydraulic pressure source,
   wherein:
   the first hydraulic pressure source is a master cylinder that is shut off from the reservoir so that a flow of the hydraulic fluid from the reservoir into the master cylinder is interrupted when the brake operating member is operated, and that pressurizes the hydraulic fluid stored in the hydraulic chamber of the first hydraulic pressure source in accordance with the operation amount of the brake operating member; and
   the regulator included in the second hydraulic pressure source adjusts the pressure of the hydraulic fluid delivered from the power hydraulic pressure source in accordance with the pressure of the hydraulic fluid in the hydraulic chamber of the first hydraulic pressure source.

15. The brake control apparatus according to claim 1, wherein the fist predetermined group of wheel cylinders each apply braking force to rear wheels from among the plurality of wheels when supplied with the hydraulic braking fluid, and wherein the second predetermined group of wheel cylinder each apply braking force to front wheels from among the plurality of wheels when supplied with the hydraulic braking fluid.

16. The brake control apparatus according to claim 1, wherein a braking force allocated to the first predetermined group of wheel cylinders is less than a braking force allocated to the second predetermined group of wheel cylinders.

17. The brake control apparatus according to claim 1, wherein, when the wheel cylinder pressure deviates from the target pressure, the wheel cylinder pressure control system stops controlling the wheel cylinder pressure:
   after the hydraulic fluid from the second hydraulic pressure source is initially supplied to each of the plurality of wheel cylinders and the hydraulic fluid from the first hydraulic pressure source is not supplied to any of the plurality of wheel cylinders, and
   before the hydraulic fluid from the second hydraulic pressure source is supplied to both a first predetermined group and a second predetermined group of wheel cylinders of the plurality of wheel cylinders and the hydraulic fluid from the first hydraulic pressure source is supplied to only the second predetermined group of wheel cylinders of the plurality of wheel cylinders.

18. A brake control method, comprising:
   controlling, when a wheel cylinder pressure, which is a pressure of hydraulic fluid supplied to a plurality of wheel cylinders, deviates from a target pressure while the wheel cylinder pressure is controlled using hydraulic fluid pressurized in response to a supply of power, a manner in which the hydraulic fluid is supplied to the wheel cylinders so that the hydraulic fluid from a regulator is initially supplied to each of the plurality of wheel cylinders and the hydraulic fluid from a master cylinder is not supplied to any of the plurality of wheel cylinders, then the hydraulic fluid from the regulator is supplied to both a first predetermined group and a second predetermined group of wheel cylinders of the plurality of wheel cylinders and the hydraulic fluid from the master cylinder is supplied to only the second predetermined group of wheel cylinders of the plurality of wheel cylinders.

19. The brake control method according to claim 18, wherein, when the wheel cylinder pressure deviates from the target pressure, the manner in which the hydraulic fluid is supplied to the wheel cylinders is controlled so that the regulator is mechanically communicated with the wheel cylinders before the master cylinder is communicated with the wheel cylinders.

20. A brake control method, comprising:
providing a plurality of wheel cylinders that each apply braking force to one of a plurality of wheels when supplied with hydraulic fluid; a wheel cylinder pressure control system that controls a wheel cylinder pressure, that wheel cylinder pressure being a pressure of the hydraulic fluid supplied to the wheel cylinders, independently of an operation of a brake operating member; and a manual hydraulic pressure source that includes a first hydraulic pressure source which pressurizes a hydraulic fluid stored in a hydraulic chamber of the first hydraulic pressure source in accordance with an operation amount of the brake operating member; and a second hydraulic pressure source that includes a regulator that adjusts a pressure of a hydraulic fluid stored in a hydraulic chamber of the second hydraulic pressure source in accordance with the pressure of the hydraulic fluid in the hydraulic chamber of the first hydraulic pressure source;

interrupting communication between the manual hydraulic pressure source and the wheel cylinders when the wheel cylinder pressure control system controls the wheel cylinder pressure, while permitting the communication between the manual hydraulic pressure source and the wheel cylinders so that the hydraulic fluid is supplied from the manual hydraulic pressure source to the wheel cylinders when the wheel cylinder pressure deviates from a target pressure, and controlling, when the wheel cylinder pressure deviates from the target pressure, a manner in which the hydraulic fluid is supplied to the wheel cylinders so that the hydraulic fluid from the second hydraulic pressure source is initially supplied to each of the plurality of wheel cylinders and the hydraulic fluid from the first hydraulic pressure source is not supplied to any of the plurality of wheel cylinders, then the hydraulic fluid from the second hydraulic pressure source is supplied to both a first predetermined group and a second predetermined group of wheel cylinders of the plurality of wheel cylinders and the hydraulic fluid from the first hydraulic pressure source is supplied to only the second predetermined group of wheel cylinders of the plurality of wheel cylinders.

* * * * *